Nov. 15, 1960 C. B. TRONSLIN 2,960,278

TAPE REEL MOUNTING

Filed June 19, 1957 2 Sheets-Sheet 1

INVENTOR.
Cyril B. Tronslin
BY
Flehr & Swain
ATTORNEYS

Nov. 15, 1960 C. B. TRONSLIN 2,960,278

TAPE REEL MOUNTING

Filed June 19, 1957 2 Sheets-Sheet 2

INVENTOR.
Cyril B. Tronslin

BY [signature]

ATTORNEYS

United States Patent Office 2,960,278

Patented Nov. 15, 1960

2,960,278

TAPE REEL MOUNTING

Cyril B. Tronslin, Palo Alto, Calif., assignor to Ampex Corporation, Redwood City, Calif., a corporation of California Filed June 19, 1957, Ser. No. 666,611

6 Claims. (Cl. 242—68.3)

This invention relates generally to mounting means for detachably securing tape reels upon a rotatable turntable or like rotatable means.

Conventional magnetic tape machines employ turntables or like rotatable means to which the tape reels are applied. The tape is driven past a magnetic record and/or playback head by capstan means engaging the length of the tape extending between the reels. Suitable torque means are associated with the turntables whereby for various operating conditions, such as a recording, playback, fast forward, and/or rewind, the tape is maintained under tension as it leaves one reel and is fed to the capstan, and as it leaves the capstan and is wound upon the other reel. For the proper and convenient operation of such equipment, the reels should be firmly held upon the turntables or like rotatable supporting means, while at the same time the mounting means should permit the reels to be quickly removed and applied.

In general it is an object of the present invention to provide an improved reel mounting and retaining means which will permit quick removal and application of a reel to a turntable, and the firm retention of the reel during normal operation of the machine.

Another object is to provide reel mounting means of the above character which in its operation will provide evenly distributed pressure serving to urge and retain the reel upon the turntable.

Another object is to provide tape reel mounting and retaining means wherein all of the operating parts are nonloseable in that they are secured to and retained upon the turntable.

Another object is to provide reel mounting means of simple construction, which can be readily and conveniently operated.

Additional objects and features of the invention will appear from the following description in which the preferred embodiment has been set forth in detail in conjunction with the accompanying drawing.

Referring to the drawing.

Figure 1:
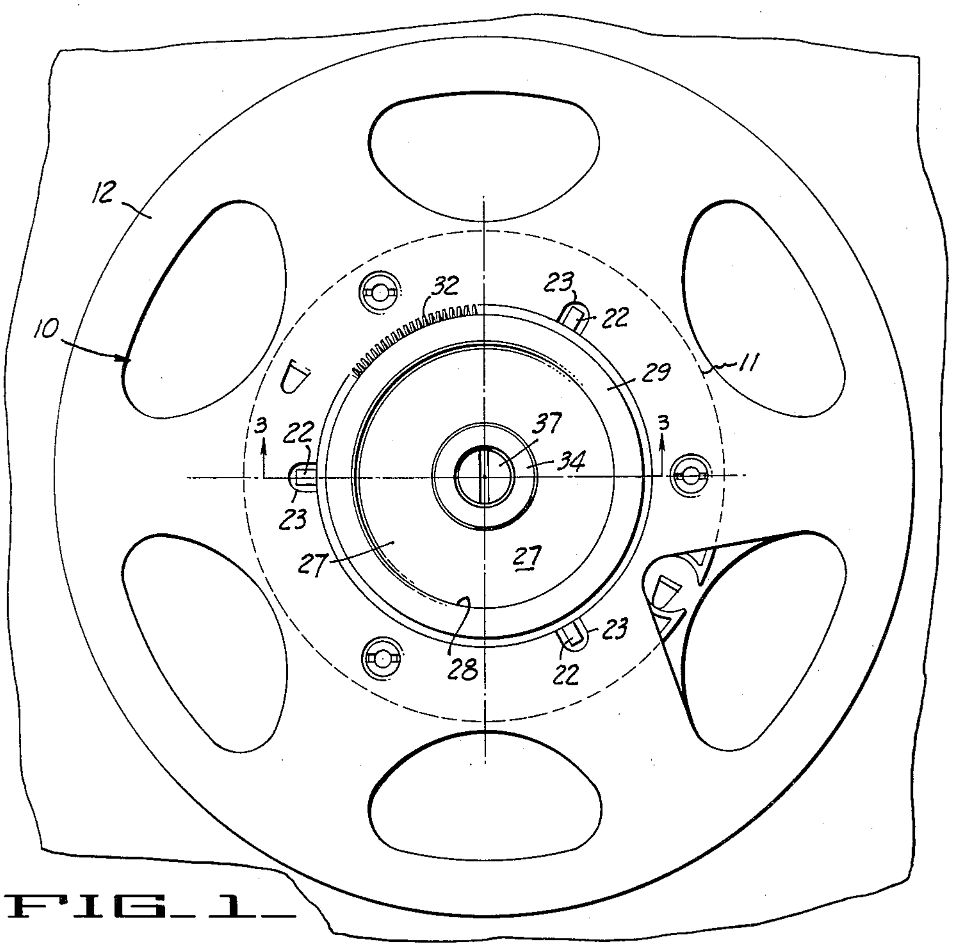
Figure 1 is a plan view illustrating reel mounting means incorporating the present invention, together with a reel and associated turntable.
Figure 2:
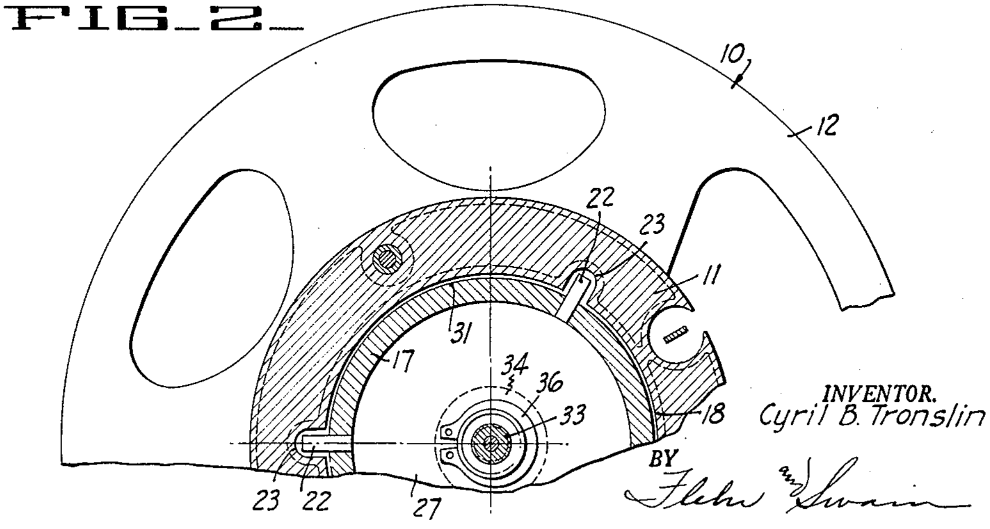
Figure 2 is a cross sectional view taken along the line 2—2 of Figure 3 but on a scale the same as Figure 1.

In Figures 1 and 2 there is shown a typical reel 10 such as is employed for the handling of magnetic tape, and which in practice is applied to the turntables or other rotatable reel supporting means of magnetic tape record and/or playback machines. In some instances the reel is made from suitable metal, such as aluminum, while in other instances it may be molded from a suitable plastic material. In general the reel consists of an annular hub 11, together with the spaced circular sides 12.

Figure 3:
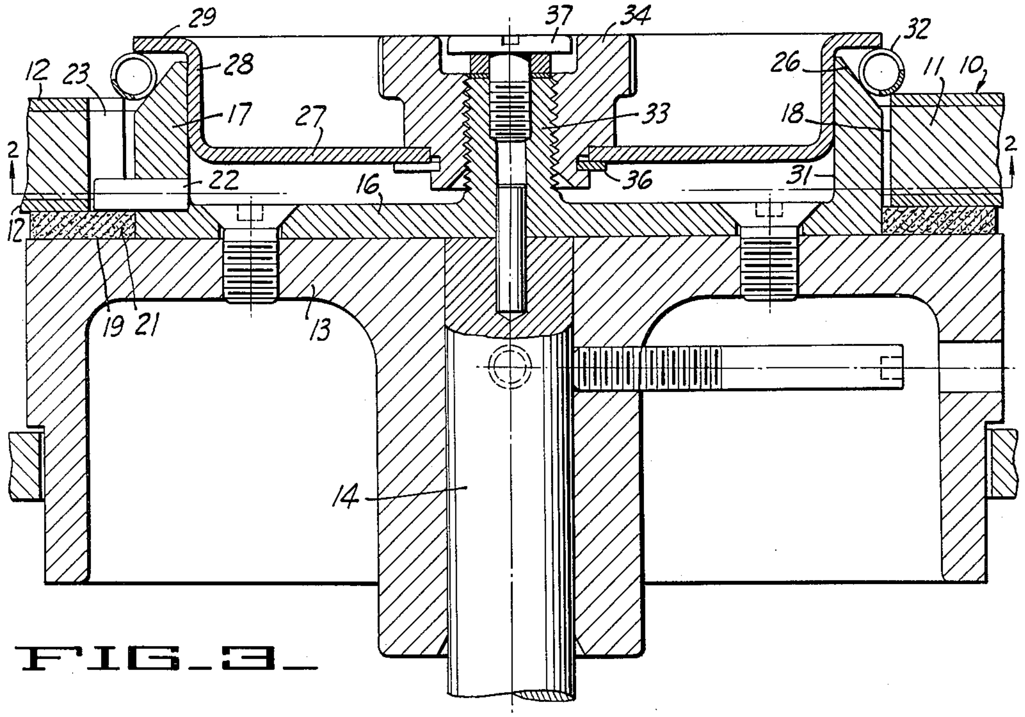
Figure 3 is a cross sectional detail on an enlarged scale taken along the lines 3—3 of Figure 1.
Figure 4:
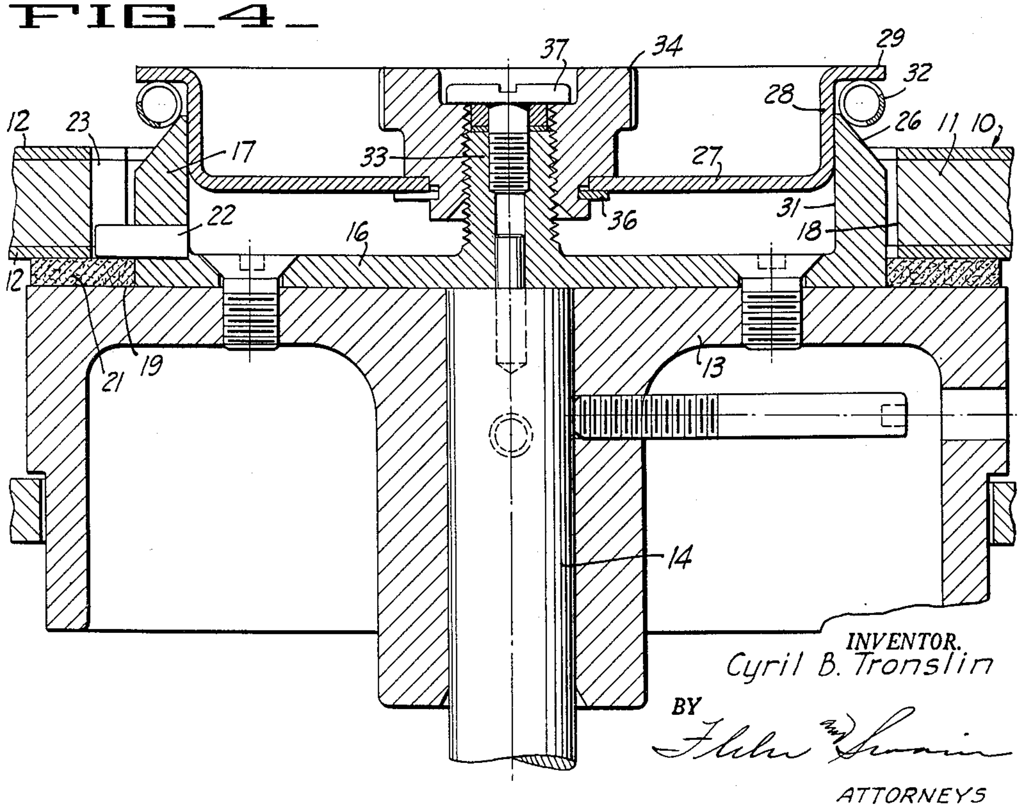
Figure 4 is a view like Figure 3 but showing the parts in a different operating position.

The turntable 13 illustrated in Figures 3 and 4 is mounted upon the rotatable shaft 14. This may be the shaft of a torque motor, and may be associated with suitable torque control or braking means. The turntable includes a member 16 that is provided with an annular rim 17. The outer periphery of rim 17 has a diameter slightly less than the diameter of opening 18 in the reel hub 11 (Figure 2), whereby the rim functions as reel centering means.

The turntable provides an annular shoulder face 19 which underlies the reel, and which is covered by an annular seating member 21 of yieldable material, such as compressed cork or cork and rubber composition. One or more pins or studs 22 are carried by the turntable or the rim 17, and their projecting ends are accommodated in the slots 23 formed in the reel hub 11. The outer end of the rim 17 is provided with a beveled surface 26. As shown in Figure 4, this surface extends above and below the plane of the adjacent outer side of the reel.

Within the rim 17 there is a disc-like member 27, which is formed to provide the rim and flange portions 28 and 29. The rim portion 28 has an outer diameter slightly less than the diameter of the inner peripheral surface 31 of the rim 17, while the flange 29 is dimensioned to overlie the outer end face of the rim. An elastic member 32, which in its preferred form is a garter spring formed of coiled spring wire, is interposed (in its retracted position) between the flange 29 and the outer end of the rim 17. As shown in Figure 3, this spring may assume either the retracted position shown in Figure 4, or the expanded or projected position shown in Figure 3.

Suitable means is employed for moving the member 27 in a direction longitudinally of the axis of the shaft 14, whereby the elastic member 32 is moved between its retracted and expanded positions. The preferred means illustrated for this purpose consists of a threaded stud 33 which is fixed to member 16 and disposed concentric with the axis of shaft 14. The nut 34, which can be turned manually, is threaded upon the stud. Suitable means, such as a snap ring 36, serves to attach the member 27 to the nut, while permitting the nut to rotate. Rotation of the nut in one direction can be limited by the screw 37.

Operation of the reel mounting means described above is as follows. When the elastic member 32 is in the retracted position shown in Figure 4, its outer diameter is lesser than the diameter of the opening in the reel hub, and therefore the reel can be positioned upon the turntable, with the studs 22 within the reel hub slots 23. The operator now turns the nut 34 whereby the flange 29 forces the elastic member 32 downwardly over the beveled surface 26. This causes the elastic member to be shifted toward the reel while at the same time increasing its diameter. The turning of nut 34 is continued until member 32 presses upon the inner peripheral edge of the reel hub in the manner shown in Figure 3. In this projected or reel clamping position, the member 32 presses equally upon the entire inner periphery of the reel hub, thus applying evenly distributed pressure upon the reel and urging the reel against the yieldable material 21. When it is desired to remove the reel, the operator merely turns the nut 34 in a reverse direction until the flange 29 has been moved sufficiently far to permit the elastic member 32 to move back to the retracted position shown in Figure 4.

A feature of the invention is that the member 27 is somewhat self aligning in its movements within the rim 17, and this contributes to the application of evenly distributed clamping pressure from the elastic member 32 to the reel. In other words, if for a particular reel there is a tendency for the elastic member 32 to contact the reel first on one side of the turntable, then continued turning movement of the nut 34 will be accompanied by self aligning action with the result that the other circumferential portions of the elastic member will be moved into engagement with the reel, whereby after final tightening of the nut 34, the pressure is evenly distributed.

All of the operating parts are carried by the turntable for both reel mounting and reel removed conditions, whereby they are nonloseable.

While it is desirable to make use of an elastic member in the form of a garter spring formed of coiled spring wire, it is possible to use other types of annular elastic members which are capable of expansion upon being forced over the beveled surface 26, to apply proper clamping pressure against the reel. For example, I can make use of so-called O-rings, formed of natural or synthetic rubber, and having sufficient hardness to apply the proper clamping pressure.

I claim:

1. Mounting means for detachably securing a tape reel to a rotatable shaft, the reel having a central opening therethrough for accommodating the mounting means, a reel seating member carried by the shaft and upon which the tape reel is adapted to seat, with one side face of the reel engaging one face of said seating member, an annular reel centering member on the seating member and having an outer annular periphery dimensioned to be accommodated within the central opening of the reel, and manually operable means carried by said centering member and including an annular elastic member radially expandable to engage and press against the inner peripheral edge of the central opening at the other side face of the reel and being radially retractable clear of said reel.

2. Mounting means as in claim 1 in which said last means includes a member manually rotatable to effect expansion and contraction of said annular elastic member.

3. Mounting means for detachably securing a tape reel to a rotatable shaft, wherein the reel has a central opening for accommodating mounting means, a reel seating member carried by the shaft and upon which a tape reel is adapted to seat, with one side face of the reel engaging one face of said seating member, an annular reel centering member carried by the seating member and having an annular periphery dimensioned to be accommodated within the central opening of the reel, a beveled surface formed on that end of the centering member that is adjacent the other side of the reel, an elastic annular member embracing the centering member and engaging said beveled surface, said member normally being stressed whereby it tends to press against said surface, and retractable means for displacing the elastic member along said beveled surface between reel engaging and reel disengaged positions, the beveled surface and said elastic member being dimensioned whereby said elastic member is caused to expand when displaced toward the reel to thereby engage and press the reel against said first member, and whereby when the elastic member is permitted to retract the reel may be removed from the centering member.

4. Mounting means as in claim 3 in which said elastic member is a garter spring made of coiled spring wire.

5. Mounting means as in claim 3 in which said retractable means includes a member carried by said centering member for movements toward and away from the seating member, said member having an annular flange engaging said elastic member to displace the same toward the reel, and manually operable means for causing movements of said last member toward and away from said seating member.

6. Mounting means for detachably securing a tape reel to a rotatable shaft wherein the reel has a central opening for accommodating mounting means, a reel seating member carried by the shaft and upon which a tape reel is adapted to seat, with one side face of the reel engaging one face of said member, an annular reel centering member carried by the seating member and having an annular periphery dimensioned to be accommodated within the central opening of the reel, a beveled surface formed on that end of the centering member that is adjacent the other side of the reel, a garter spring formed of coiled spring wire engaging said beveled surface and stressed whereby it tends to tighten upon said surface, a cup-shaped disc slidably interfitting said centering member, said disc having an annular flange adapted to overlie and engage one side of the garter spring, a threaded stud carried by the seating member, and a nut engaging the threaded stud and manually rotatable to cause movement of the disc toward or away from the seating member to translate the garter spring into reel engaging or dis-engaged positions.

References Cited in the file of this patent

UNITED STATES PATENTS

| | | |
|---|---|---|
| 2,466,950 | Hillmer | Apr. 12, 1949 |
| 2,862,677 | Selsted | Dec. 2, 1958 |

FOREIGN PATENTS

| | | |
|---|---|---|
| 390,537 | Germany | Feb. 20, 1924 |
| 600,158 | Great Britain | Apr. 1, 1948 |